United States Patent

Royle et al.

Patent Number: 6,080,989
Date of Patent: Jun. 27, 2000

[54] APPARATUS AND METHODS FOR DETECTING AND/OR IMAGING GAMMA RADIATION

[75] Inventors: Gary John Royle; Robert David Speller, both of London, United Kingdom

[73] Assignee: British Nuclear Fuels PLC, Risley, United Kingdom

[21] Appl. No.: 08/973,959

[22] PCT Filed: Jun. 24, 1996

[86] PCT No.: PCT/GB96/01497

§ 371 Date: Mar. 16, 1998

§ 102(e) Date: Mar. 16, 1998

[87] PCT Pub. No.: WO97/01769

PCT Pub. Date: Jan. 16, 1997

[30] Foreign Application Priority Data

Jun. 24, 1995 [GB] United Kingdom .................. 9512935

[51] Int. Cl.[7] .................................................. G01T 1/169
[52] U.S. Cl. ............... 250/366; 250/363.01; 250/363.02; 250/370.09
[58] Field of Search .............................. 250/370.09, 366, 250/363.01, 363.02

[56] References Cited

U.S. PATENT DOCUMENTS 4,857,737  8/1989  Kamae et al. ..................... 250/370.09
4,967,084 10/1990  Rich et al. ............................... 250/361
5,567,944 10/1996  Rohe et al. ........................ 250/370.09

FOREIGN PATENT DOCUMENTS 0 542 561 A1  11/1992  European Pat. Off. .
0 667 539 A1   8/1995  European Pat. Off. .

OTHER PUBLICATIONS

Redus, R.H., Nagarkar, V., Cirignano, L.J., McGann, W., and Squillante, M.R., A Nuclear Survey Instrument with Imaging Capability, vol. 2, Watertwon, MA, pp. 1354–1357, published Nov. 2, 1991.

Royle, G.J. and Speller, R.D., Design of a Compton Camera for Imaging 662 keV Radionuclide Distributions, Nuclear Instruments & Methods in Physics Research, Section A, 1994, pp. 623–626.

Primary Examiner—Constantine Hannaher
Attorney, Agent, or Firm—Workman, Nydegger & Seeley

[57] ABSTRACT

A gamma detection and modeling system in which the energy deposition and incident locations on two detectors are used to calculate the source. The detector assembly and processing means are provided as distinct units allowing the detectors' use in radioactive and other inaccessible areas. The gamma radiation image can be superimposed on an optical image of the monitored location. Various detector arrays from a simple pair of detectors through single first and multiple second detectors to combinations of such detector pairs are disclosed together with a method for their use.

24 Claims, 4 Drawing Sheets

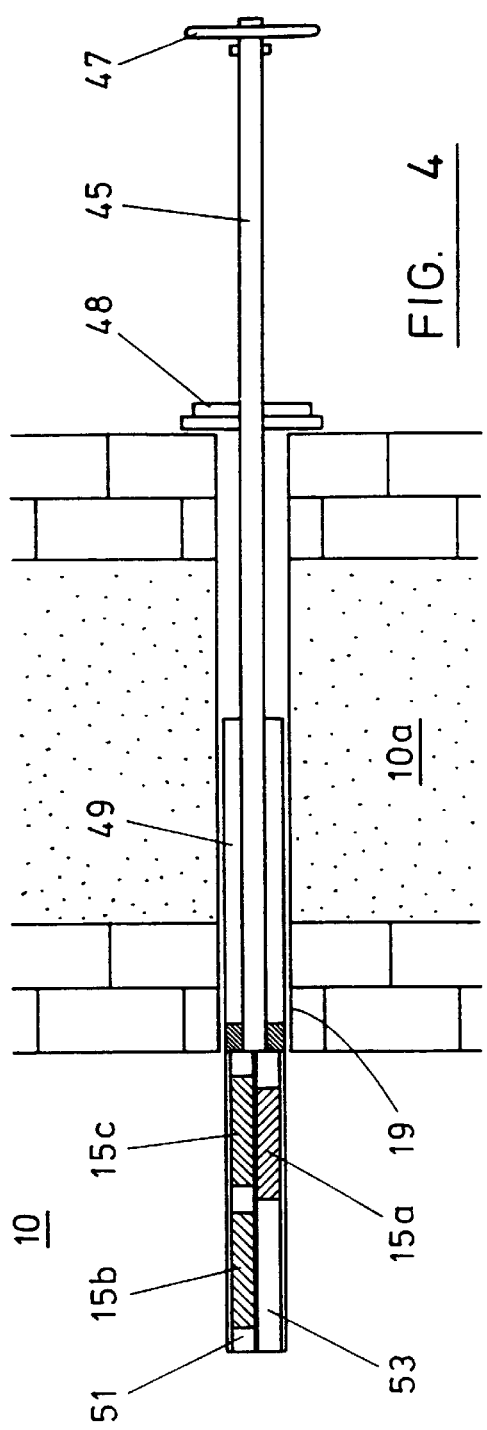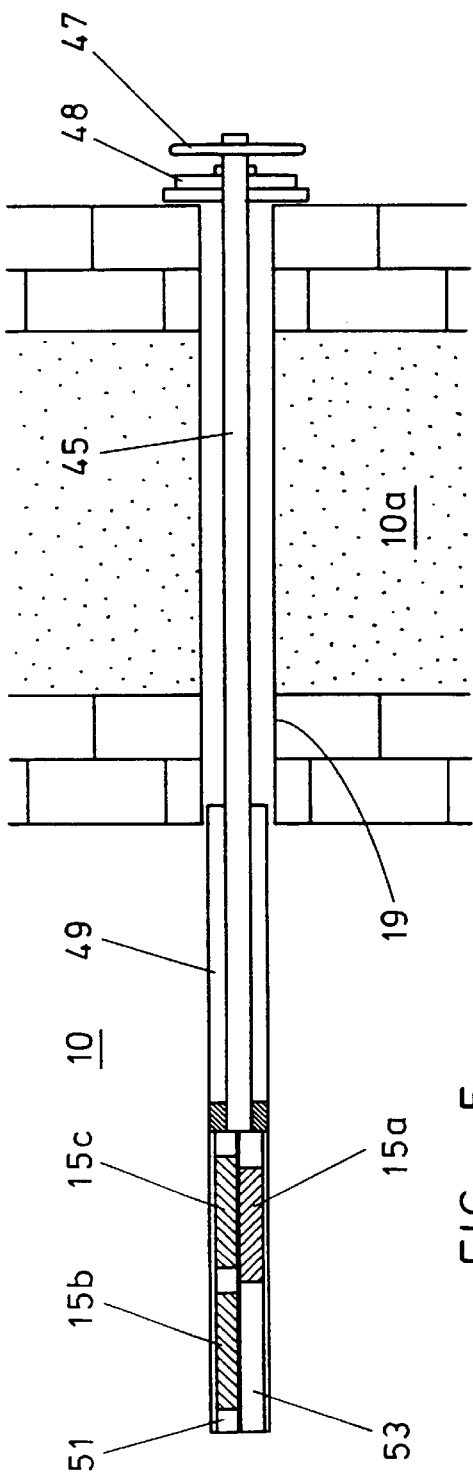

APPARATUS AND METHODS FOR DETECTING AND/OR IMAGING GAMMA RADIATION

The present invention relates to arrangements for detecting and/or imaging gamma radiation especially using a Compton camera.

The detection and/or imaging of gamma emitting radioactive materials whose distribution is unknown requires one of a broad range of techniques which include:

Collimation—where a gamma radiation image is produced on a position sensitive gamma radiation detector or on film coated with gamma radiation sensitive emulsion by heavy (e.g. lead or tungsten) collimators. The collimators allow only gamma photons passing along certain predetermined trajectories to pass readily towards the detectors or films. Gamma photons and scattered radiation passing along all other pathways are, as far as possible, prevented from progressing towards the detectors or films.

Anti Collimation—where a gamma radiation image appears when two images from a position sensitive gamma radiation detector are compared; one image being taken whilst a small gamma attenuating object (e.g. lead or tungsten) is used to cast a gamma radiation shadow onto the position sensitive gamma radiation detector.

Compton Camera—where a gamma radiation image can be formed by detecting many near coincident events on pairs of gamma radiation detectors in an array of such gamma radiation detectors. A coincident event is assumed to comprise an incident gamma photon detected on one detector by releasing a Compton scattered electron, the photon being detected a short time later on the second detector. The energies measured in the two events are used with the standard Compton scatter equation to back-calculate the trajectory of the original incident gamma photon, which can be placed somewhere on the surface of a hollow cone whose apex is positioned at the centre of the first detector.

Compton cameras employed in the prior art are large, heavy, delicate devices which employ heavy shielding material, (e.g. lead or tungsten) as part of the outer casing of the device. Such shielding material encloses various of the gamma radiation detector elements and position sensitive gamma radiation detectors as a means of improving the rejection of unwanted detection events. The gamma radiation detectors used also usually require to be cooled below room temperature, involving more bulk and weight.

Most prior art Compton Cameras have been developed for medical application in 3D imaging of injected radionuclides where a single gamma photon energy is involved. Although portable to a degree they would, because of their size, weight and delicate nature be limited to use in only a limited number of applications in which it is desirable to image radioactive materials. For example, whilst some gamma radiation imaging devices for the Nuclear Power Industry may be required in fixed installations, such as imaging the content of waste sentencing cells, many other applications within the Nuclear Power Industry will require highly mobile gamma radiation imaging systems. These will need to be small, light and rugged as they may be needed for remote deployment deep within nuclear facilities, often where man-access is prohibited and/or where it is necessary to carry out remote investigations or remote manipulative operations. Conventional Compton cameras are not suitable for such uses.

The present invention aims to provide a solution to the problem of imaging gamma emitting sources within a radioactive or otherwise inaccessible cell, where conventional Compton cameras or other gamma radiation imaging systems are not suitable.

According to the present invention there is provided apparatus for determining a source of gamma radiation using the Compton effect by detecting gamma photons emitted by the source, comprising:

a first gamma photon detector;

a second gamma photon detector;

and a signal recorder and processor for recording and processing outputs from the first and second detectors, the signal recorder and processor comprising means for recording coincidences between outputs from the first detector and outputs from the second detector;

means for recording measurements of the energy deposited by gamma photons incident on the first detector when coincidences are recorded between the outputs of the first and second detectors;

and means for calculating from the said energy measurement the source co-ordinates of source of the gamma photons incident on the first detector, wherein the first and second detectors are located inside a radiation shielded enclosure in which the source is present and the signal recorder and processor is located outside the said enclosure.

According to a second aspect of the invention we provide apparatus for detecting or imaging a source of gamma radiation, the apparatus comprising:

a detector assembly providing a first gamma photon detector and a second gamma photon detector in a known spatial relationship;

and processing means providing means for determining the energy deposited by gamma photons incident on the first detector;

means for determining coincidences between the incidence outputs of the first and second detectors; and means for calculating from said determined energy deposited the source co-ordinates of the gamma photon.

Preferably means are provided for determining the energy deposited by gamma photons incident on the second detector.

Preferably the detector assembly is remote from the processing means. Preferably the detector assembly is substantially spaced (for instance over 2 meters) from the processing means in use. In this way the hazard, for instance radiological dose to the system operators and sensitive system components are minimised during the investigation of the gamma source. The provision of remote processing/monitoring also reduces the size of the detector assembly itself.

Alternatively the processing means may be provided in the detector assembly.

The gamma radiation source may, therefore, be within an enclosure or open area unsafe for human access.

The said enclosure or area may for example comprise:

a cell in which manipulative operations are carried out on radioactive materials, e.g. to handle irradiated nuclear fuel;

a containment area, e.g. a storage area or sealed vessel or container for waste products from processing or re-processing of nuclear fuel.

Such a cell may for example comprise a structure having walls and a floor and ceiling, for instance made from concrete.

Access to the gamma radiation sources for the detector assembly may be through one or more narrow access holes, doors or passage ways. These may be provided through the walls or ceiling of the structure or through shielding around the area and preferably permit communication between the detector assembly and the processing means. The apparatus may be deployed by means of crane, rod or remote manipulator systems. The access may be specifically generated to give access to the detector assembly.

The detector assembly may be inserted into the area or structure when imaging is required and removed following use. The detector assembly may have a first state to allow passage into the area or structure to be monitoring and a second deployed state during monitoring. The detector assembly may exceed one or more dimensions of the access aperture in the deployed state. Preferably the transition between first and second state is reversible to allow retraction.

The incidences and/or energy deposited on the first and/or incidences on the second detector and/or coincidences may be recorded. All incidences and/or energy deposited may be recorded or only those events having the required coincidence level.

The processing of the signals may occur during monitoring. Alternatively the signals may be recorded for processing after completion of the monitoring procedure.

The means for recording coincidences may form part of an electronics unit outside the shielded enclosure or well away from the detectors.

The detectors and/or processing means are preferably selective to certain gamma photon energies. Thus the apparatus may be tuned to detect gamma outputs characteristic of certain isotopes. Imaging and/or detection may be carried out at a selection of different gamma energies either simultaneously or sequentially.

Signals may be passed from the detectors to the processing means by electrically conducting connections or other means such as optical signals along optical guides, radio waves, infra-red or any other medium of communication.

The means for determining coincidences between the first and second detector outputs may select those signals received within a given time range. The given time range may be less than 300 nanoseconds or preferably less than 100 nanoseconds, for instance in the range 10–300 nanoseconds.

The detectors may be powered by an electrical connection to an external source, which may be mains power or battery sourced. Alternatively a battery supply close to the detectors, for instance in the detector assembly, may be employed.

The first and/or second gamma radiation detectors may comprise solid-state detectors or scintillation detectors or other means providing an indication of collision with a gamma photon. The first detector also needs to provide an indication of the energy absorbed during that collision.

The detectors may comprise solid state detectors, e.g. made of germanium, or alternatively scintillation detectors, e.g. comprising sodium iodide or caesium iodide.

Preferably the first and second detectors are provided close to one another, for instance within 5 to 25 and preferably 10 to 15 cm. The relative known spatial position of the first and second detectors may be fixed or variable. Where variable positions are used it is preferred that the respective positions be controlled by the operator or the processing means.

Preferably the first detector is provided closer to the gamma source than the second detector. Higher scattering angles may, however, be detected by the alternate arrangement.

The arrangement may provide only a first and second detector with known positions relative to one another. To obtain imaging information the output is preferably monitored or recorded at a first position of the detectors relative to the gamma source for a period of time and subsequently at a second position of the detectors relative to the gamma source. A final combined image or information may be produced by processing the data from the separate positions. A single set of recording and processing equipment may be used.

The first and second positions may be provided by moving both first and second detectors, for instance rotationally, laterally or vertically, or by moving one of the detectors only, for instance rotationally, laterally or vertically.

Preferably the detector assembly is provided with one or more further second detectors. The output may be processed for this detector in a similar manner. Thus coincidences for this detector may also be compared with detection's by the first detector.

The further second detectors may be provided a regular array with respect to the first detector, for instance in symmetrical positions where even numbers of second detectors are used, or in an irregular but known array.

The first and one second detector may be fixed relative to one another, the positions of the further second detectors being adjustable.

A plurality of first detectors may be provided together with one or more second detectors.

In one particular form of the apparatus there may be at least a first set of detectors and a second set of detectors, each set comprising a plurality of individual detectors, each plurality forming an individual camera unit. Coincidences may be detected in each set between gamma photons incident on a first detector in the set and those incident on a second detector in the set and optionally between gamma photons incident on the first detector and on a third or further second detector in the set. One, two or more second detectors may be employed. Information gathering at a higher rate may thus be provided and the need to move the detectors may be avoided. Real time imaging may be provided using such a system.

Desirably, the detectors are located and held in the said enclosure or area, which may be radiation shielded, by means which permits movement of the camera, formed by each pair of the detectors, relative to the source and/or cell.

The movement may be by rotation, insertion or retraction, lateral, vertical or arc movements relative to the source or enclosure or a combination of two or more such movements. This movement may be achieved by attaching the respective sets to elongate members. The elongate members may be fitted through access holes provided through the shielding of the area or enclosure. The position of the said detector sets on the elongate members may be independently adjustable relative to the shielding. Where more than one set of detectors is used in this way the sets may be introduced through a plurality of access holes into the area or cell.

In the said particular form of the invention, the camera unit formed by the first set of detectors and the camera unit formed by the second set of detectors may each be movable relative to the shielding of the area or enclosure or to the source, preferably independently.

The second detectors in each set may also be rotatable relative to the first detectors about the axis of the said elongate member. The first detector may be coaxial to the member or offset like the second detector(s). Movement of the second detectors without moving the first may be provided.

Each said elongate member may be a rod which can be extended away from or withdrawn toward the access hole.

The rod may carry at its inner end a sleeve in which the detectors of each set may be contained.

The purpose of moving and/or rotating the camera units comprising sets of detectors is to provide different camera views of the enclosure or area being monitored. The reason for this is that the quality of the image produced of the gamma emitting scene is dependent upon achieving a number of different views of the gamma scene.

The arrangement according to the present invention beneficially allows imaging of point or distributed gamma sources within a area, shielded enclosure or cell allowing only limited access to monitoring equipment.

A video camera (not shown) or other monitoring device may be inserted into the enclosure, alongside, or in the same position or positions as the Compton camera and an image of the inside of the area or cell may be formed. The image may be produced simultaneously with the gamma source image or at another time.

If the precise position and orientation of the video camera is also known then further processing within the processing unit, for instance using a reconstruction algorithm, can produce a superimposed image. The optical image, for instance, may be superimposed on the signals representing gamma emitting intensities in selected planes in the cell. The output video image signal may display the positions of radioactive "hot spots" in the enclosure. A selected colour or colour intensities may be used to display such "hot spots".

The imaging data may relate to different radioactive isotopes or radiological activity levels may be displayed in different colours or different intensities.

Information on the gamma radiation image is available in three dimensions from analysis of data from the Compton Camera. Further processing from the processing unit can be used to produce three dimensional gamma radiation images for use with 3D modelling software on computers. 3D radiation scenes could be superimposed onto 3D models of the enclosure in which they are taken.

The superimposition of images may be provided during real-time on-line monitoring and/or during subsequent analysis.

According to a third aspect of the invention we provide a method for detecting or imaging a source of gamma radiation, the method comprising:

providing a detector assembly comprising a first gamma photon detector and a second gamma photon detector in a known spatial relationship in proximity to a gamma source;

and determining by processing means comprising means for determining the energy deposited by gamma photons incident on the first detector, means for determining coincidences between the incidence outputs of the first and second detectors, and means for calculating from said determined energy deposited the source co-ordinates of the gamma photon.

Preferably the energy deposited by gamma photons incident on the second detector is determined.

The detector assembly may be placed in proximity with the gamma radiation source through one or more access holes, doors or passage ways into an area or enclosure.

The detector assembly may be inserted in a first state to allow passage into the area or structure to be monitoring and used in a second deployed state during monitoring, wherein the detector assembly may exceed one or more dimensions of the access aperture in the deployed state. Preferably the transition between first and second state is reversible to allow retraction.

The method may provide for the processing of the signals during monitoring or alternatively the signals may be recorded for processing after completion of the monitoring procedure.

The method may comprise the step of varying the relative known spatial position of the first and second detectors.

The method preferably provides a first and second detector with known positions relative to one another in which the detector output is preferably monitored or recorded at a first position of the detectors relative to the gamma source for a period of time and subsequently at a second position of the detectors relative to the gamma source.

Alternatively the method comprise the monitoring of signals from a first detector and two or more second detectors of different positions.

Alternatively the method may comprise monitoring or recording the output from a first pair of first and second detectors and monitoring the output from a second pair of first and second detectors.

The movement of one or more of the detectors relative to one another, of one or more of the detectors relative to the source or of one or more of the pairs of detectors relative to one another or the source may be effected by means of rotation, insertion, retraction, lateral, vertical or arc movements relative to the source or enclosure or a combination of two or more such movements.

The method may provide the further step of generating a video camera or other image of the gamma sources surroundings and producing a superimposed image together with the gamma source image.

Various other features of the method are set out above with regard to the first and second aspects of the invention.

Embodiments of the present invention will now be described by way of example with reference to the accompanying drawings, in which:

FIG. 4 is a sectional side view of a construction for locating gamma detectors inside a radiation shielded cell.

FIG. 5 is a sectional side view of the construction of FIG. 4 extended into the cell interior.

Figure 1:
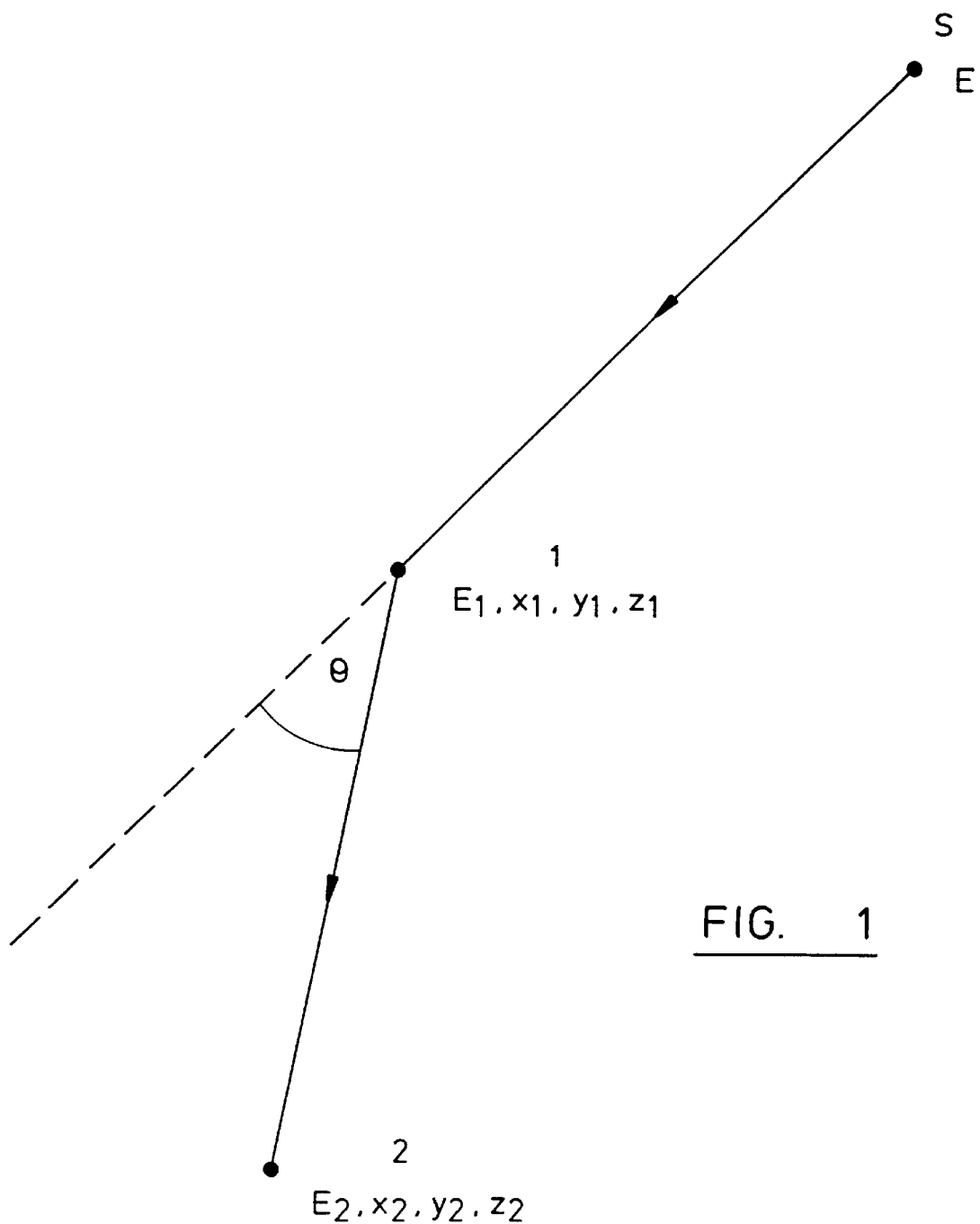
FIG. 1 is a diagrammatic illustration of the principle of gamma photon detection by use of the Compton effect.

FIG. 1 illustrates the principle of a Compton camera. Consider a two detector system in which a photon emitted by a source (S) undergoes a Compton interaction in a first detector (1) and is scattered towards a second detector (2) in which it is photoelectrically absorbed. A coincidence detection mode is employed to ensure that the two interactions observed are caused by the same photon. Knowledge of the energy deposited, $E_1$ in detector (1) by the Compton interaction enables the scatter angle θ as shown to be determined using the relationship $$\cos\theta = 1 - M_0C^2(1/E_1) - (1/E)),$$

Where $M_0C^2$ is the electron rest energy and E is the incident photon energy.

If the co-ordinates of the first interaction at detector (1)($X_1$ $Y_1$ $Z_1$) and of the second interaction at detector (2) ($X_2$ $Y_2$ $Z_2$) are known, together with θ, it follows that the emission point must lie on the surface of a cone, with semi-angle θ, whose axis passes through both interaction points (1, 2). A series of photons emitted from the point sources would generate a set of cones. These cones have one common point in three dimensional space, which defines the image point.

A radiating body consists of a distribution of sources rather than a point source, hence a summation of the intersection points of a large number of conical surfaces will be a volume whose three dimensional shape describes the source object.

If therefore photons which scatter within detector (1) and are absorbed within detector (2) are counted and the spectrum of the energy $E_1$ deposited in detector (1) is measured for such photons, the co-ordinates of gamma photon point sources giving rise to the detected energy spectrum can be calculated.

The detector (1) and the detector (2) are conventionally referred to as the "front" and "back" detectors.

The choice of front and back detectors is an important consideration. The angular resolution of the camera unit formed by the front and back detectors is dependent upon the energy resolution of the front detector and the spatial resolution of both front and back detectors. The detector type also influences the overall sensitivity of the camera. The superior energy resolution of solid state detectors is desirable but they have the disadvantages of increased size owing to the need for a cooling cryostat and also increased cost. Reasonable angular resolution could still be achieved with a scintillation counter with good spatial resolution.

Improved resolution of the image of the source is obtained by using multiple front and back detectors for example as described below.

Figure 2:
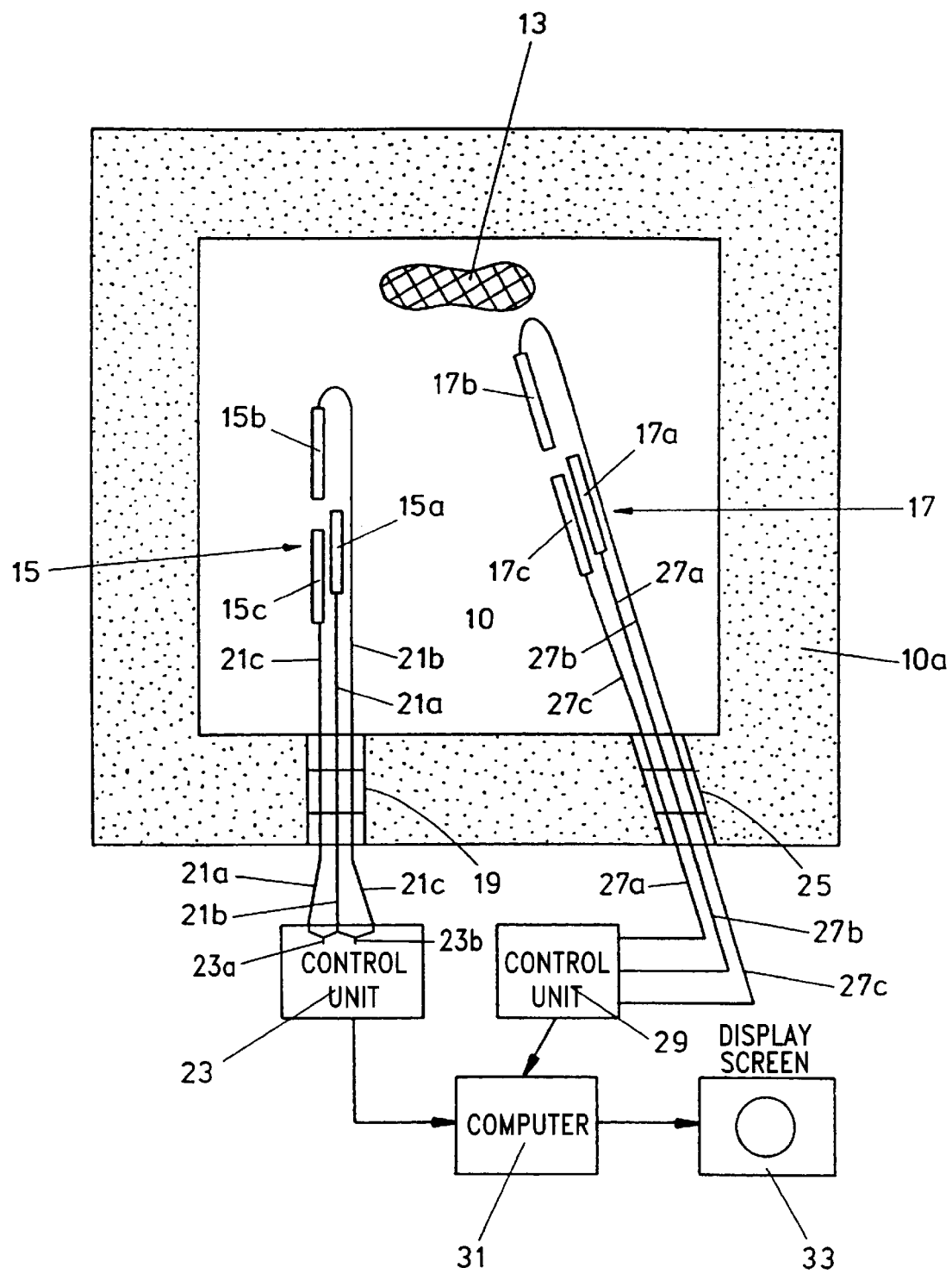
FIG. 2 is a diagram partly in sectional form and partly in block circuit diagram form of a detection arrangement embodying the invention.

FIG. 2 shows a radiation shielded enclosure or cell (10) which is or has been used for carrying out operations on radioactive material of high activity level, e.g. treatment of irradiated nuclear fuel. The cell (10) has a cell wall (10a) and encloses a region (13) of radioactive material which comprises a distributed source of gamma radiation which is to be imaged using the above principles. A first gamma detector arrangement (15) or camera unit is located in the cell (10) and a second gamma detection arrangement (17) or camera unit is located at a different location in the cell (10). The arrangement (15) comprises a set of detectors including a so-called front detector (15a) and two so-called back detectors (15b) and (15c). The arrangement (17) comprises a set of detectors including a so-called front detector (17a) and two so-called rear detectors (17b, 17c). The detectors (15a, 15b,15c) are connected via a sealed access hole (19) through the wall (10a) by cables (21a,21b,21c) respectively to an electronics control unit (23). Likewise, the detectors (17a, 17b,17c) are connected via a sealed access hole (25) through the wall (10a) by cables (27a,27b,27c) respectively to an electronics control unit (29). Each of the cables (21a,21b, 21c;27a,27b,27c) comprises a pair of conductors allowing an operation voltage to be applied across a detector crystal of its corresponding detector and at least one output conductor to enable signals to be processed to be passed from the output of the corresponding detector to the appropriate electronics unit. The outputs of the electronics units (23,29) may be further processed in a digital computer (31) and outputs from the computer (31) may be displayed on a visual display unit (33).

The unit (23) comprises two channels (23a,23b). The channel (23a) processes pulses from the front detector (15a) and the back detector (15b) and the channel (23b) processes pulses from the front detector (15a) and the back detector (15c) in a similar manner.

Figure 3:
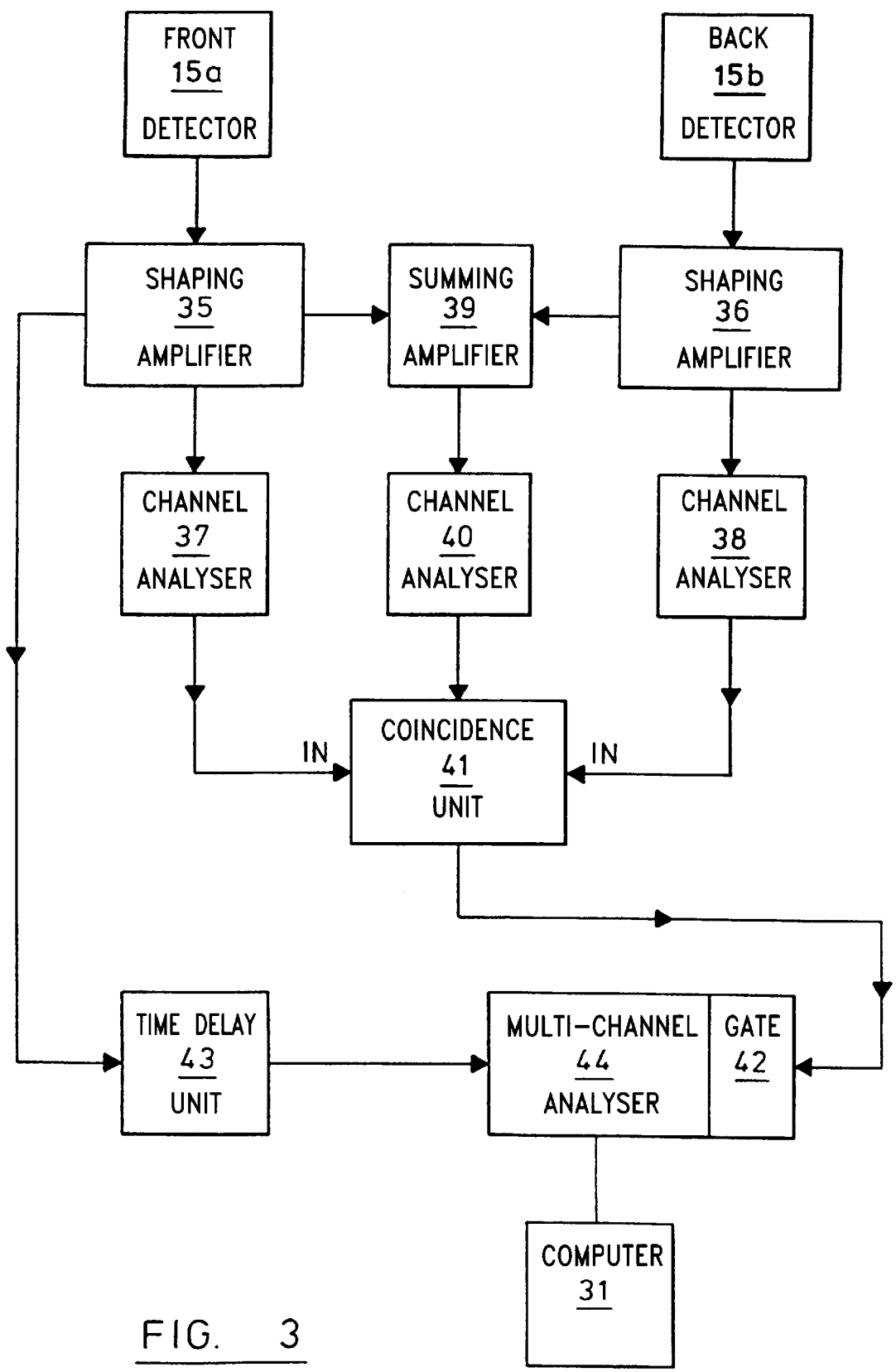
FIG. 3 is a block circuit diagram of an electronics unit as used in the arrangement shown in FIG. 2.

The channel (23a) will now be described with reference to FIG. 3. The outputs of the front detector (15a) and rear detector (15b) are amplified and shaped respectively by pulse shaping amplifiers (35,36). The outputs of the pulse shaping amplifiers (35,36) are fed respectively to single channel analysers (37,38) and both outputs are fed to a summing amplifier (39). The output of the summing amplifier (39) is fed to a single channel analyser (40). The single channel analyser (40) produces an output when the magnitude of the input pulse from the summing amplifier (39) is within a pre-determined range. Outputs produced by the single channel analysers (37,38,40) are fed to a coincidence unit (41). Outputs from the coincidence unit (41) are fed into a gate (42) controlling a multi-channel analyser (44). Outputs from the pulse shaping amplifier (35) are also passed via a time delay unit (43) to the multi-channel analyser (44). Outputs from the multi-channel analyser (44) are applied as an input to the digital computer (31).

The channel (23a) illustrated in FIG. 3 operates in the following manner. All coincident detection pulses produced by the front detector (15a) and back detector (15b) are, following shaping and amplification, added together in the summing amplifier (39). The energy of the gamma photon incident on the front detector (15a) determines the size of the pulse produced by the summing amplifier (39) which adds the pulses produced by the individual amplifiers (35,36). In order to limit incoming gamma photons to those from a given energy source, e.g. 662 keV, the single channel analyser (40) is set to produce an output only when the output pulse from the amplifier (39) shows an energy as measured by the output pulse magnitude equal to the required energy $E \pm \Delta E$ where $\pm \Delta E$ is a factor, e.g. $\pm 10\%$, set to produce a suitable energy window. Thus, an energy window of $E \pm \Delta E$ is set on the single channel analyser (40) and only summed pulses representing energies lying within this window will produce an output by the single channel analyser (40).

The coincidence unit (41) detects coincidences between pulses produced by the front detector (15a) and by the back detector (15b) together with coincident outputs from the single channel analyser (40) when the input gamma photon energy is in the correct energy window. When coincidences are detected between its three inputs the coincidence unit (41) produces an output signal which opens the gate (42).

When the gate (42) is open the multi-channel analyser (44) will accept an input signal to record. The pulse produced by the pulse shaping amplifier (35), suitably delayed by the time delay unit (43) so that it arrives at the multi-channel analyser when the gate (42) is open, is thereby received by the analyser (44) and is deposited as a single count in one of a multiplicity of photon energy channels or windows in the analyser (44) as determined by the pulse magnitude. The analyser (44) may for example have channels representing 0.5 keV steps over the energy range 0 to 700 keV.

The analyser (44) therefore counts, over a given period of time, the number of admitted signals in each of the given energy channels. The output of the analyser (44) therefore comprises a signal corresponding to a histogram of the number of counted coincidences for a series of pulse sizes representing energy channels.

The output of the analyser (44) is delivered to the computer (31) in which it may be further processed as described below and subsequently stored and, if required, displayed by the video display unit (33) (FIG. 2) as required.

The channel (23b) (not shown) of the electronics unit (23) has a similar construction and operation to the channel (23a) except that it processes pulses received by the front detector (15a) and the back detector (15c). An energy spectrum is formed in a separate multi-channel analyser (not shown) and the output of that analyser is applied for further processing to the computer (31).

The electronics unit (29) (FIG. 2) has a construction and operation similar to that of the unit (23) and therefore builds up in a first processing channel a signal comprising the number coincidences for the correct initial incident photon energy between gamma photons detected by the front detector (17a) and the back detector (17b), and in a second channel a signal comprising the coincidences for the correct initial photon energy between gamma photons detected by the detectors (17a,17c) outputs in each case being assigned to pulse magnitude or energy channels whereby a histogram is constructed in each case. The outputs of the two processing channels of the unit (29) may be delivered to the computer (31) in which they may be further processed as described below and subsequently stored and displayed.

FIG. 4 shows a construction for locating either of the detector arrangements (15,17) in the cell (10). By way of illustration, the arrangement (15) comprising the detectors (15a,15b,15c) is shown in FIG. 4. A rod (45) having a handle (47) outside the cell (10) extends through the access hole (19) formed through the wall (10a) and extends into the interior of the cell (10). The rod (45) may be pushed into or pulled from the cell (10) as required. The rod (45) passes through a member (48) fixed to the outside of the wall 10a to cover the access hole 19.

The handle (47) which is outside the cell (10) may be rotated thereby to rotate the camera unit comprising the arrangement (15) of detectors (15a,15b,15c). This enables different views of the interior of the cell (10) to be imaged.

The inner end of the rod (45) is affixed to the inside of a sleeve (49) which is slidable through the bore of the access hole (19a) through the wall (10a). The sleeve (49) may thereby be extended from or withdrawn into the access hole (19a) as required. FIG. 5 shows the sleeve (49) in its extended position.

The sleeve (49) incorporates at its end remote from the handle (47) an upper internal tube (51) and a lower internal tube (53). The internal tube (53) incorporates the so-called front detector (15a). The internal tube (51) incorporates the so-called back detectors (15b,15c) one behind the other. By adjustment of the rod (45) the position of the arrangement (15) comprising the detector (15a,15b, 15c) relative to the wall (10a) may be varied. In addition, by rotation of the tubes (51,53) about the axis of the sleeve (49) the views imaged by the arrangement (15) may be selectively varied.

Calibrated marks on the rod (45) allow its length inside the cell (10) to be adjusted so that the arrangement (15) can be positioned in a known location. Also, calibrated marks on the member (48) allow the angular position of the handle (47) and hence the angular rotational position of the arrangement (15) to be observed. For a reconstruction algorithm employed by the computer (31) to build an image of the interior of the cell (10) it is necessary to know at the time of measurement where each of the detectors is in the cell (10) and the calibrated markings facilitate specification of these locations.

A series of signals may thereby be obtained in the manner described with reference to FIG. 1 each being a two-dimensional representation of the co-ordinates of gamma photon counts or intensities from elements of area in a selected plane perpendicular to the rod (45) in the cell (10).

The connections to the detectors (15a,15b,15c) are omitted for clarity in FIGS. 4 and 5.

An optical video camera (not shown) may be inserted in the sleeve (49) in place of the tubes (51,53) and an optical image of the inside of the cell (10) may be formed. Using a reconstruction algorithm in the computer (31) an electronic signal representative of the optical image may be superimposed on the signals representing gamma intensities in selected planes in the cell (10) whereby an output video image signal may be provided to the display unit which displays the positions of radioactive "hot spots" in the cell (10). A selected colour may be used to display such "hot spots". Different radioactive isotopes may be displayed in different colours.

Each front-back detector pair has its own signal processing channel for electronically processing and recording the data in the manner described with reference to FIG. 3. The output of a measurement is an energy spectrum of the energy deposited by all gamma rays which are Compton scattered in the front detector and then absorbed by the back detector. Each front-back detector pair produces such an energy spectrum. At every different position and/or rotation of the camera unit comprising each front-back detector pair, a different set of energy spectra are produced. The reconstruction process considers each energy spectrum in turn and maps each energy channel of that spectrum onto the corresponding pixel of the image. The corresponding pixel is calculated from knowledge of the energy deposited during the Compton scatter process and from knowledge of the locations of each of the detectors within the enclosure. When each energy channel of each spectrum has been mapped (i.e. for each front-back detector pair, position and rotation) the image will be seen. Further image processing can then be used to improve the appearance of the image.

What is claimed is:

1. Apparatus for determining a source of gamma radiation using the Compton effect by detecting gamma photons emitted by the source, comprising:

a first gamma photon detector;

a second gamma photon detector, the first and second gamma photon detectors having a known relative spatial position;

and a signal recorder and processor for recording and processing outputs from the first and second detectors, the signal recorder and processor comprising means for recording coincidences between outputs from the first detector and outputs from the second detector;

means for recording measurements of the energy deposited by gamma photons incident on the first detector when coincidences are recorded between the outputs of the first and second detectors;

and means for calculating from the said energy measurement and the known relative spatial position of the first and second gamma photon detectors the source co-ordinates of source of the gamma photons incident on the first detector, wherein the first and second detectors are located inside a radiation shielded enclosure in which the source is present and the signal recorder and processor is located outside the said enclosure, the relative spatial position of the first detector and the second detector being variable.

2. Apparatus for detecting or imaging a source of gamma radiation, the apparatus comprising:

a detector assembly providing a first gamma photon detector and a second gamma photon detector in a known relative spatial relationship;

processing means for determining the energy deposited by gamma photons incident on the first detector;

means for determining coincidences between the incidence outputs of the first and second detectors; and means for calculating from said determined energy deposited and the known relative spatial position of the first and a second gamma photon detectors the source co-ordinates of the gamma photon, the relative spatial position of the first detector and second detector being variable.

3. Apparatus according to claim 2 in which the detector assembly is remote from the processing means.

4. Apparatus according to claim 2 wherein an access to the source of gamma radiation for the detector assembly comprises one or more narrow access holes, doors, walls or passage ways into an area or structure.

5. Apparatus according to claim 4 in which the detector assembly has a first state to allow passage into the area or structure to be monitoring and a second deployed state during monitoring, the detector assembly exceeding one or more dimensions of the access holes, doors, walls or passage ways in the deployed state.

6. Apparatus according to claim 4 in which the detectors are located and held in the area by an elongate member which permits relative movement of the detectors relative to the source and/or area.

7. Apparatus accordingly to claim 6 in which the second detector is rotatable relative to the first detector about the axis of the said elongate member.

8. Apparatus according to claim 6 in which said elongate member is a rod which can be extended away from or withdrawn toward the access hole, the rod carrying at its inner end a sleeve in which the detectors may be contained.

9. Apparatus according to claim 2 in which the incidences and/or energy deposited on the first detector and/or incidences on the second detector and/or coincidences are recorded.

10. Apparatus according to claim 2 in which the detectors and/or processing means are selectively tuned to detect gamma outputs characteristic of certain isotopes.

11. Apparatus according to claim 2 in which signals are passed from the detectors to the processing means by electrical connections or optical signals or radio waves or infra-red.

12. Apparatus according to claim 2 in which only a first and second detector with known positions relative to one another are provided and wherein signals from the first and second detector are monitored or recorded at a first position of the detectors relative to the gamma source for a period of time and subsequently at a second position of the detectors relative to the gamma source.

13. Apparatus according to claim 12 in which the first and second positions are provided by moving both first and second detectors or by moving one of the detectors only.

14. Apparatus according to claim 2 in which the detector assembly is provided with one or more further first and/or second detectors, the coincidences for these detectors also being compared with detections by the second or first detectors respectively.

15. Apparatus according to claim 14 in which the further second detectors are provided a regular array with respect to the first detector or in an irregular but known array.

16. Apparatus according to claim 2 in which at least a first set of detectors and a second set of detectors, each set comprising a plurality of individual detectors, each plurality forming an individual camera unit are provided.

17. Apparatus according to claim 16 in which the first and second sets are provided on separate support elements.

18. Apparatus according to claim 2 in which a video camera or other imaging device is inserted into the area, alongside, or in the same position or positions as the detector assembly and an image of the inside of the area is formed and superimposed on the signals representing gamma emitting intensities in selected planes in the area.

19. A method for detecting or imaging a source of gamma radiation, the method comprising:

providing a detector assembly comprising a first gamma photon detector and a second gamma photon detector in a known relative spatial relationship in proximity to a gamma source;

and providing processing means, the processing means comprising means for determining the energy deposited by gamma photons incident on the first detector, means for determining coincidences between the incidence outputs of the first and second detectors, and means for calculating from said determined energy deposited and the known relative spatial position of the first and second gamma photon detectors the source coordinates of the gamma photon, the relative spatial position of the first detector and second detector being variable.

20. A method according to claim 19 in which the detector output is monitored or recorded at a first position of the detectors relative to the gamma source for a period of time and subsequently at a second position of the detectors relative to the gamma source.

21. A method according to claim 19 in which the monitoring of signals from a first detector and two or more second detectors of different fixed positions is provided.

22. A method according to claim 19 in which the monitoring of signals from two or more first detectors and a second detector is provided.

23. A method according to claim 19 in which the method comprises monitoring or recording the output from a first pair of first and second detectors and monitoring the output from a second pair of first and second detectors.

24. A method according to claim 19 in which the method provides the further step of generating a video camera or other image of the gamma sources surroundings and producing a superimposed image together with the gamma source image.

* * * * *

UNITED STATES PATENT AND TRADEMARK OFFICE
CERTIFICATE OF CORRECTION

PATENT NO.    : 6,080,989
DATED         : June 27, 2000
INVENTOR(S)   : Gary John Royle; Robert David Speller It is certified that error appears in the above-identified patent and that said Letters Patent is hereby corrected as shown below:

Column 1,
Line 20, before "where" change "Anti Collimation" to -- Anti-Colimation --

Column 2,
Line 39, after "source" change "co-ordinates" to -- coordinates --

Column 3,
Line 44, after "which may be" change "mains" to -- mainly --

Column 10,
Line 50, after "recorder and processor" change "is" to -- are --

Signed and Sealed this

Twenty-sixth Day of March, 2002

*Attest:*

JAMES E. ROGAN
*Attesting Officer*       *Director of the United States Patent and Trademark Office*